(12) United States Patent
Lee

(10) Patent No.: US 6,317,057 B1
(45) Date of Patent: Nov. 13, 2001

(54) METHOD FOR DETECTING LANE DEVIATION OF VEHICLE

(75) Inventor: Dong-Min Lee, Kyungki-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/750,736

(22) Filed: Dec. 29, 2000

(30) Foreign Application Priority Data

Apr. 3, 2000 (KR) .............................. 2000-17259

(51) Int. Cl.$^7$ ...................................................... G08G 1/00
(52) U.S. Cl. .................. 340/901; 340/937; 340/988; 340/435; 340/436; 340/439; 340/907; 340/903; 340/904
(58) Field of Search ..................... 340/901, 937, 340/988, 435, 436, 439, 907, 903, 904

(56) References Cited

U.S. PATENT DOCUMENTS

| | | |
|---|---|---|
| 5,661,472 * | 8/1997 | Kashizawa .......................... 340/901 |
| 5,790,403 * | 8/1998 | Nakayama ..................... 364/424.033 |
| 5,835,028 * | 11/1998 | Bender et al. ....................... 340/937 |
| 5,890,083 * | 3/1999 | Franke et al. ......................... 701/45 |
| 6,005,492 * | 12/1999 | Tamura et al. ....................... 340/937 |
| 6,057,754 * | 5/2000 | Kinoshita et al. ................... 340/435 |

\* cited by examiner

Primary Examiner—Daniel J. Wu
Assistant Examiner—Tai T. Nguyen
(74) Attorney, Agent, or Firm—Christie, Parker & Hale, LLP

(57) ABSTRACT

In a method for detecting lane deviation of a vehicle, a difference between a center point of lane markers and a center point of the vehicle is first determined. Then a difference between a screen center x-coordinate and a vehicle center point x-coordinate is subtracted from the determined difference between the center point of lane markers and the center point of the vehicle. And it is determined that the vehicle is deviating from the lane if the result of the subtraction is less than a predetermined value.

3 Claims, 4 Drawing Sheets

METHOD FOR DETECTING LANE DEVIATION OF VEHICLE

BACKGROUND OF THE INVENTION (a) Field of the Invention

The present invention relates to a method for precisely detecting the deviation from a lane by a vehicle.

(b) Description of the Related Art

Vehicles are driven in a lane between lane markers. However, drivers may sometimes inadvertently drive vehicles out of the lane as a result of a distraction, carelessness, fatigue, etc. A potentially dangerous situation results if the driver does not quickly correct his or her error. Accordingly, there have been proposed methods and systems that detect the deviation from a lane by a vehicle, then alert the driver by the sounding of an alarm or by providing a visual warning.

Such systems and methods perform the task of determining lane deviations by ascertaining the width of the lane and the position of the vehicle with respect to the lane markers. Many processes are involved in this process. The initial step is to detect the left and right lane markers in front of the vehicle. Calculations are then performed using the detected left and right lane markers by utilizing predetermined values established in a memory table. The width of the lane is determined by these calculations. Next, a longitudinal center line between the detected lane markers corresponding to a halfway point between the lane markers is determined and a position of a longitudinal center line of the vehicle, which is established in the memory table and varies according to vehicle type, is detected. Finally, the center lines are compared and lane drifting is determined to be occurring if the center lines do not correspond within a predetermined range. If the vehicle is determined to be deviating from the lane, the driver is alerted.

In conventional systems and methods as described above, however, the erroneous detection of lane deviation may occur when there are curves in the road and also when changing lanes such that the driver is unnecessarily alerted.

SUMMARY OF THE INVENTION

The present invention has been made in an effort to solve the above problems.

It is an object of the present invention to provide a method for precisely detecting the deviation from a lane by a vehicle.

To achieve the above object, the present invention provides a method for detecting lane deviation of a vehicle comprising the steps of determining a difference between a center point of lane markers and a center point of the vehicle; subtracting a difference between a screen center x-coordinate and a vehicle center point x-coordinate from the determined difference between the center point of lane markers and the center point of the vehicle; and determining that the vehicle is deviating from the lane if the result of the subtraction is less than a predetermined value.

According to a feature of the present invention, the center point of the lane markers is determined by, in an image with 256×256 pixels (x,y), setting points corresponding to equations of left and right lane markers as the lane markers using a y=|a| position as a basis, then setting a center of the left and right lane markers as the center point of the lane markers.

According to another feature of the present invention, after the center point of the lane markers is obtained and with consideration of a direction the vehicle is travelling, the center point of the vehicle is determined by obtaining a straight line equation passing through the lane marker center point and perpendicular to a straight line passing through an end off frame and the lane marker center point, reversing signs of slopes in the straiqht line equation, then setting a point of intersection of a left lane marker and a right lane marker as the center point of the vehicle.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 1:
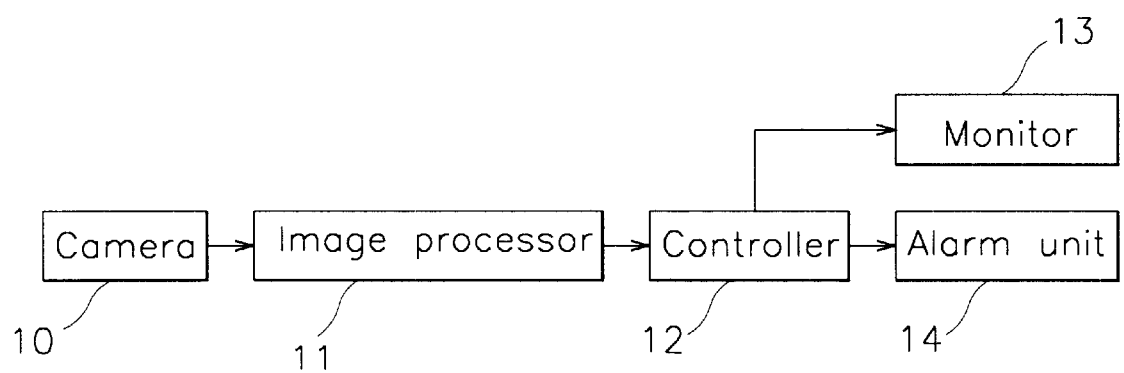
FIG. 1 is a block diagram of a system for detecting lane deviation of a vehicle to which the present invention is applied.

FIG. 1 shows a block diagram of a system for detecting lane deviation of a vehicle to which the present invention is applied.

The system includes a camera 10 for collecting images of a lane in which a vehicle is traveling and outputting corresponding image signals; an image processor 11 for amplifying and filtering the image signals output from the camera 10, then outputting resulting image signals; a controller 12 for performing comparisons using the image signals processed by the image processor 11 using a predetermined program, storing the comparison results of the image signals, and determining if the vehicle is deviating from the lane; a monitor 13 for displaying images corresponding to signals output from the controller 12; and an alarm unit 14 for alerting the driver that the vehicle is deviating from the lane if the controller 12 determines that the vehicle is deviating from the lane.

Figure 2:
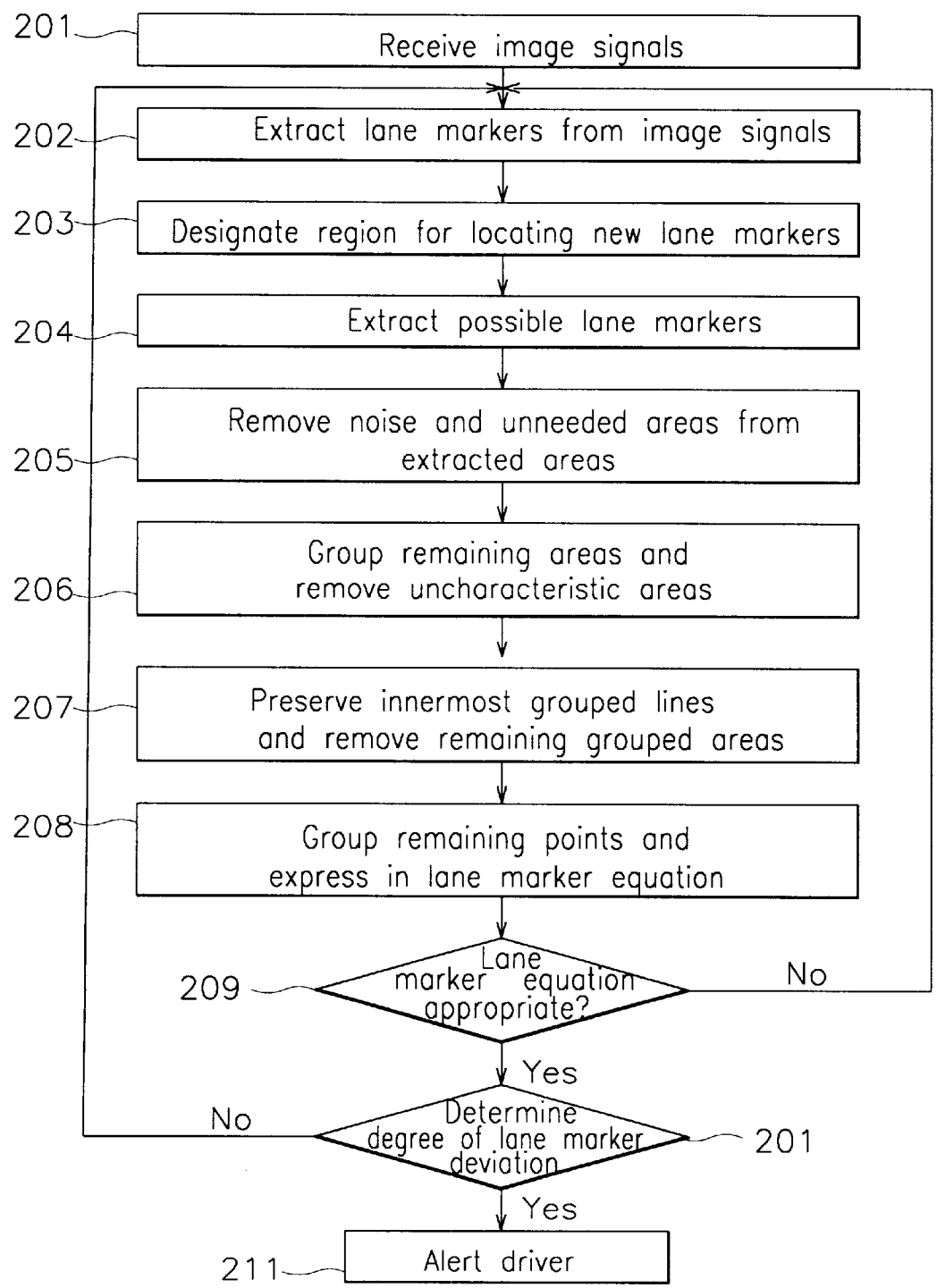
FIG. 2 is a flow chart of a method for detecting the lane deviation of a vehicle according to a preferred embodiment of the present invention.

FIG. 2 shows a flow chart of a method for detecting the lane deviation of a vehicle according to a preferred embodiment of the present invention.

First, image signals corresponding to a predetermined area in front of the vehicle are received from the camera 10 in step S201. Next, lane markers of a lane the vehicle is traveling in are extracted from the image signals in step S202. In step S202, if the lane markers are unable to be extracted or if the lane markers have changed position, a region for locating new lane markers from a position corresponding to a center of the images is designated in step S203. Subsequently, in the region designated in step S203, areas in the image possibly corresponding to the lane markers are extracted in step S204. Noise and unneeded areas are then removed from the extracted areas corresponding to the possible lane markers in the image in step S205. Next, the areas in the image left after step S204 are grouped together and areas uncharacteristic of lane markers are removed in step S206.

After step S206, in order to extract the correct lane markers among the possible many lane markers, innermost grouped lines able to be expressed by a first order equation are preserved, while the remaining grouped areas outside of the innermost lines are removed in step S207. Following this step, remaining points making up the lines are grouped and expressed in a polynomial equation (lane marker equation) with as little amount of error as possible in step S208. It is then determined if the lane marker equation is appropriate for the road the vehicle is traveling on in step S209. Next, a difference between a center of the vehicle and a center of the lane markers is determined, and it is determined if the difference is within a predetermined degree in step S210. If the difference is greater than the predetermined amount, the driver is alerted in step S211.

For the above process, the camera 10 which collects images of the lane in which the vehicle is travelling is mounted to a predetermined position on the vehicle (i.e., a center position), and the image signals output by the camera 10 are input to a lane deviation detection unit provided in the vehicle. After the vehicle is started and the lane deviation detection unit begins to operate, the camera 10 collects images of the lane and outputs corresponding image signals. The image signals are received by the image processor 11 of the lane deviation detection unit. Based on frame, vertical, and horizontal synchronization with respect to the image signals, the image processor 11 establishes a frame process, line process, display interval, then inputs the same to the controller 12. Accordingly, lane deviation is determined in the controller 12 using a predetermined program. The result of this determination is output to the monitor 13 for display, and in the case where the vehicle is determined to be deviating from the lane, an alarm is output by the alarm unit 14.

The method of the present invention described above will now be explained in more detail.

With respect to the determination of lane deviation by the controller 12, the image signals collected by the camera 10 and the signals processed by the image processor 11 are received in step S201. Next, with the input of the processed image signals, a 2×1 mask and a limit value are applied in the controller 12, and a vertical edge image (vertical properties) that suitably and without damage expresses a direction of lane markers is converted to lane marker properties to extract edges in step S202.

The edges extracted in step S202 are designated as an area that is within 10 pixels to the left and right of traces (of a lane marker equation determined in a previous frame) crossing a plane of the image in step S203. The traces of the equation determine a basic search region for finding new lane markers in the case where, in a previous frame, the lane markers are unable to be found or when there is a change in the lane markers. If the search region is designated, when lane markers appear at a vertical position of a y-axis in the image, the controller 12 records edge points of objects matching predetermined pixel widths in a possible edge list.

That is, the pixel widths have left points and right points, and among the numerous edge points appearing in a single line in the image, two points are selected and a width between the points is determined. If an illumination between left and right areas of portions is greater than an illumination of peripheral areas of portions, these portions are designated as the objects. The object images are applied in the edge extraction process, and edges with a negative sign appear in the left while edges with a positive sign appear in the right. Accordingly, the image is inspected from the right to left, and a pixel distance from where a + sign appears to where a − sign appears is determined as a width of an object. This width is then compared with a predetermined lane marker width for every y-axis position, and if the widths are similar, it is recorded in the possible edge list. These processes are performed for step S204.

Next, after the objects matching lane marker widths are separated in the image, the controller 12 removes noise and unneeded areas from the lane marker edges in step S205. To perform this operation, the limit values used in the step of extracting the edges are adjusted, that is, the limit values are designated as an average differential value of the determined search region. In adjusting the limit value of the lane markers, there is consideration of the reflective properties of the paint used in applying the lane markers of a road so that the lane markers are easily visible.

After the limit values of the lane markers are adjusted, the controller 12 then groups together associated edge points in the objects appearing in a lane marker width, and the groups not having lane marker characteristics are removed in step S206. In more detail, the grouping process is performed using the lane marker possible edge list. That is, from the list, edge points that are clustered in an area of four pixels or less are formed into one group, and groups having ten edge points or less are removed. Finally, a first degree equation that expresses each group with a minimal amount of error is derived, and groups having a negative slope in a left edge list and a positive slope in a right edge list are removed from the possible lane marker list.

Subsequently, in order to extract the correct lane markers among the many possible lane markers, only the innermost groups expressed by a first order equation are preserved, while the outer groups are removed by the controller 12 in step S207. Following this step, the controller 12 groups the edge points remaining in the possible edge list, then derives a polynomial equation that expresses the grouped points with a minimal degree of error in step S208. The least squares method is used to derive the polynomial equation.

Next, the controller 12 determines if the equation of the lane markers is appropriate for the road the vehicle is traveling on in step S209. That is, if a width of the road exceeds a possible range of road widths, only one lane marker has been extracted, or if the slopes are directed to the outside of the road, it is determined that lane marker extraction is unsuccessful in the present frame such that an alarm logic is discontinued and processing of a subsequent frame is performed.

Figure 3A:
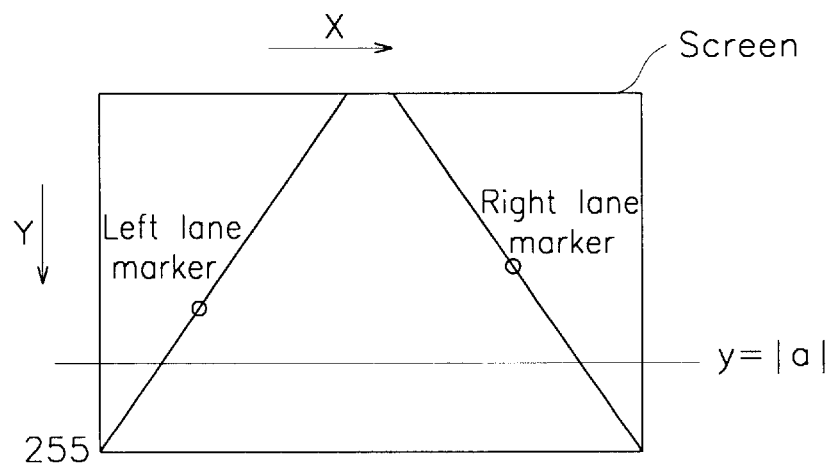
FIG. 3a is a view of a lane appearing on a monitor according to the method of FIG. 2.
Figure 3B:
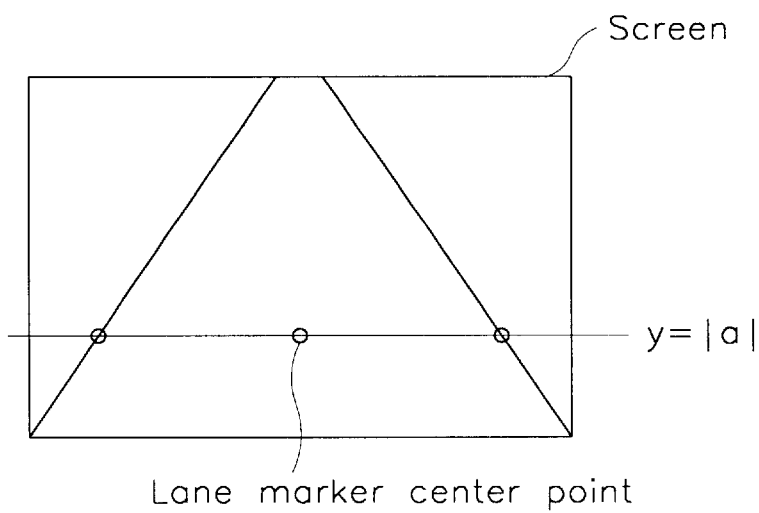
FIG. 3b is a view of a lane, with a lane center point superimposed thereon, appearing on a monitor according to the method of FIG. 2.

Next, using the derived equation, the controller 12 calculates a vehicle width and a degree of lane deviation to determine if an alarm logic requires operation in step S210. A deviation determination line is formed at a lowermost position of the screen. With reference to FIG. 3$a$, in an image with 256×256 pixels (x,y), points corresponding to the equations of the left and right lane markers are determined to be the lane markers using a y=|a| position as a basis. The equations of the left and right lane markers are obtained using the least squares method.

After the equations of the left and right lane markers are derived, the center of the lane markers is determined. Here, a center of the left and right lane markers is set as a center point of the lane markers in a coordinate axis of the screen. Accordingly, on y=|a| of FIG. 3$b$, with coordinates (a1, b1) of the left lane marker and coordinates (a2, b2) of the right lane marker, lane marker center point=(a2−a1)/2+a1, ∴x=(a2−a1)/2+a1.

Following the determination of the center of the lane markers, with consideration of a direction the vehicle is travelling, if an end off frame (EOF) and a line passing through the lane marker center are perpendicular, a straight line equation passing through the lane marker center is obtained.

First, a point of intersection of the left lane marker and right lane marker is obtained.

Left lane marker y=ax+b

Right lane marker y=cx+d

Point of intersection y=(ax+b)−(y=cx+d)=(a−c)x−(d−b)=0

∴x=(d−b)/(a−c), y=a[(d−b)/(a−c)]+b

Figure 3C:
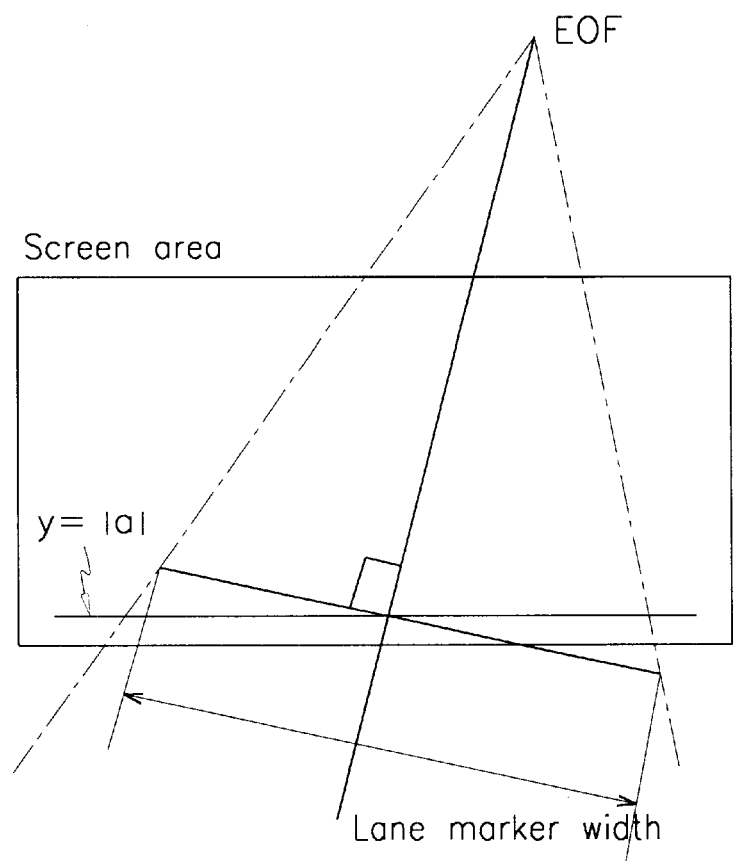
FIG. 3c is a view of a lane, with a measurement of a lane width superimposed thereon, appearing on a monitor according to the method of FIG. 2.

In the straight line equation, with reference to FIG. 3c, the point (xc, yc) is the lane marker center point.

Further, point (xp, yp) is a point of intersection of the left lane marker and the right lane marker.

Accordingly, the straight line equation, where slope=(yp−yc)/(xp−xc), y=(yp−yc)/(xp−xc) x+b, and in which (xp, yp) is substituted into the above equation, results in yp=(yp−yc)/(xp−xc) xp+b.

Also, the signs of the slopes in the straight line equation are reversed, and the space between where the left lane marker and the right lane marker intersect is determined to be the lane marker width. Subsequently, the degree of lane deviation is determined in step S210 by the following:

lane marker width/2−vehicle width/2−|screen center×coordinates−lane marker center×coordinates|, where lane marker width/2 is a variable value, vehicle width/2 is an absolute value, screen center×coordinates is an absolute value, and lane marker center×coordinates is a variable value.

After the degree of lane deviation is obtained, the controller 12 determines if a value of the deviation exceeds or is less than a predetermined value. Here, if the deviation value is greater than the predetermined value, the driver is alerted in step S211.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A method for detecting lane deviation of a vehicle comprising the steps of:

determining a difference between a center point of lane markers and a center point of the vehicle;

subtracting a difference between a screen center x-coordinate and a vehicle center point x-coordinate from the determined difference between the center point of lane markers and the center point of the vehicle; and determining that the vehicle is deviating from the lane if the result of the subtraction is less than a predetermined value.

2. The method of claim 1 wherein the center point of the lane markers is determined by, in an image with 256×256 pixels (x,y), setting points corresponding to equations of left and right lane markers as the lane markers using a y=|a| position as a basis, then setting a center of the left and right lane markers as the center point of the lane markers.

3. The method of claim 1 wherein, after the center point of the lane markers is obtained and with consideration of a direction the vehicle is travelling, the center point of the vehicle is determined by obtaining a straight line equation passing through the lane marker center point and perpendicular to a straight line passing through an end off frame and the lane marker center point, reversing signs of slopes in the straight line equation, then setting a point of intersection of a left lane marker and a right lane marker as the center point of the vehicle.

* * * * *